(12) United States Patent
Holley et al.

(10) Patent No.: US 7,321,844 B1
(45) Date of Patent: *Jan. 22, 2008

(54) METHOD AND APPARATUS FOR AVAILABILITY MEASUREMENT OF COMPLEX NETWORKS

(75) Inventors: Robert Holley, Cary, NC (US); James Trucano-Harp, Chicago, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/426,375

(22) Filed: Jun. 26, 2006

Related U.S. Application Data

(63) Continuation of application No. 10/844,268, filed on May 11, 2004, now Pat. No. 7,069,180.

(51) Int. Cl.
*G06F 13/10* (2006.01)

(52) U.S. Cl. ............... 702/182; 702/179; 702/183; 702/189

(58) Field of Classification Search ............ 702/104, 702/109, 123, 155, 181–183, 179, 189; 324/426; 455/67.4; 705/2; 703/14; 709/206; 714/724
See application file for complete search history.

(56) References Cited

U.S. PATENT DOCUMENTS

| | | | |
|---|---|---|---|
| 5,870,557 A | 2/1999 | Bellovin et al. ........ 395/200.52 |
| 5,953,704 A * | 9/1999 | McIlroy et al. ................ 705/2 |
| 6,556,832 B1 | 4/2003 | Soliman ................... 455/456 |
| 6,675,189 B2 | 1/2004 | Rehg et al. ................ 709/100 |
| 6,785,805 B1 * | 8/2004 | House et al. .................. 713/1 |
| 6,859,170 B2 * | 2/2005 | Devereux et al. ...... 342/357.06 |
| 6,873,928 B2 | 3/2005 | Thurman et al. .......... 702/127 |
| 7,069,180 B1 * | 6/2006 | Holley et al. .............. 702/182 |
| 2003/0050015 A1 * | 3/2003 | Kelly et al. ............... 455/67.4 |
| 2005/0251432 A1 * | 11/2005 | Barker et al. ................. 705/7 |

* cited by examiner

*Primary Examiner*—Eliseo Ramos-Feliciano
*Assistant Examiner*—Felix Suarez
(74) *Attorney, Agent, or Firm*—Sierra Patent Group, Ltd.

(57) ABSTRACT

A method for performing an availability measurement on a networked system comprising: identifying at least one measurement point in the system; defining a measurement model configured to return a pass or fail result corresponding to a threshold sensed at the at least one measurement point and to a measurement function; measuring the system using the measurement model, wherein measuring the system comprises a plurality of measurements; collecting a plurality of pass or fail results from the plurality of measurements, wherein each one of the plurality of pass or fail results corresponds to a measurement point and to a measurement function of one or more measurements; and aggregating the plurality of pass or fail results to formulate a single availability value representing the availability of the system.

16 Claims, 9 Drawing Sheets

METHOD AND APPARATUS FOR AVAILABILITY MEASUREMENT OF COMPLEX NETWORKS

CROSS-REFERENCE TO RELATED APPLICATIONS

This application is a continuation of U.S. patent application Ser. No. 10/844,268, filed May 11, 2004 now U.S. Pat. No. 7,069,180, which is hereby incorporated by reference as if set forth herein.

BACKGROUND

1. Field of the Disclosure

The disclosure relates generally to quality assurance, and in particular, to quality assurance in complex networks.

2. The Prior Art

Background

The cost of network downtime, as measured in lost productivity, lost revenue and lost customer good will, is increasing rapidly in both enterprise and service provider environments, where networks continue to increase in complexity. In fact, network availability is now a key critical success factor in many organizations. Availability measurements may be classified into two broad categories: hardware device failure measurements and the measurement of acceptable performance levels from the customer's point of view.

This drive towards higher availability requirements has driven the need for availability measurement of increasingly complex networks found in modern enterprises. Moreover, the identification of network availability as a critical success factor when coupled with service level agreements has further driven the need for the availability measurement of complex network systems.

BRIEF DESCRIPTION OF THE DRAWING FIGURES

DETAILED DESCRIPTION

Figure 1:
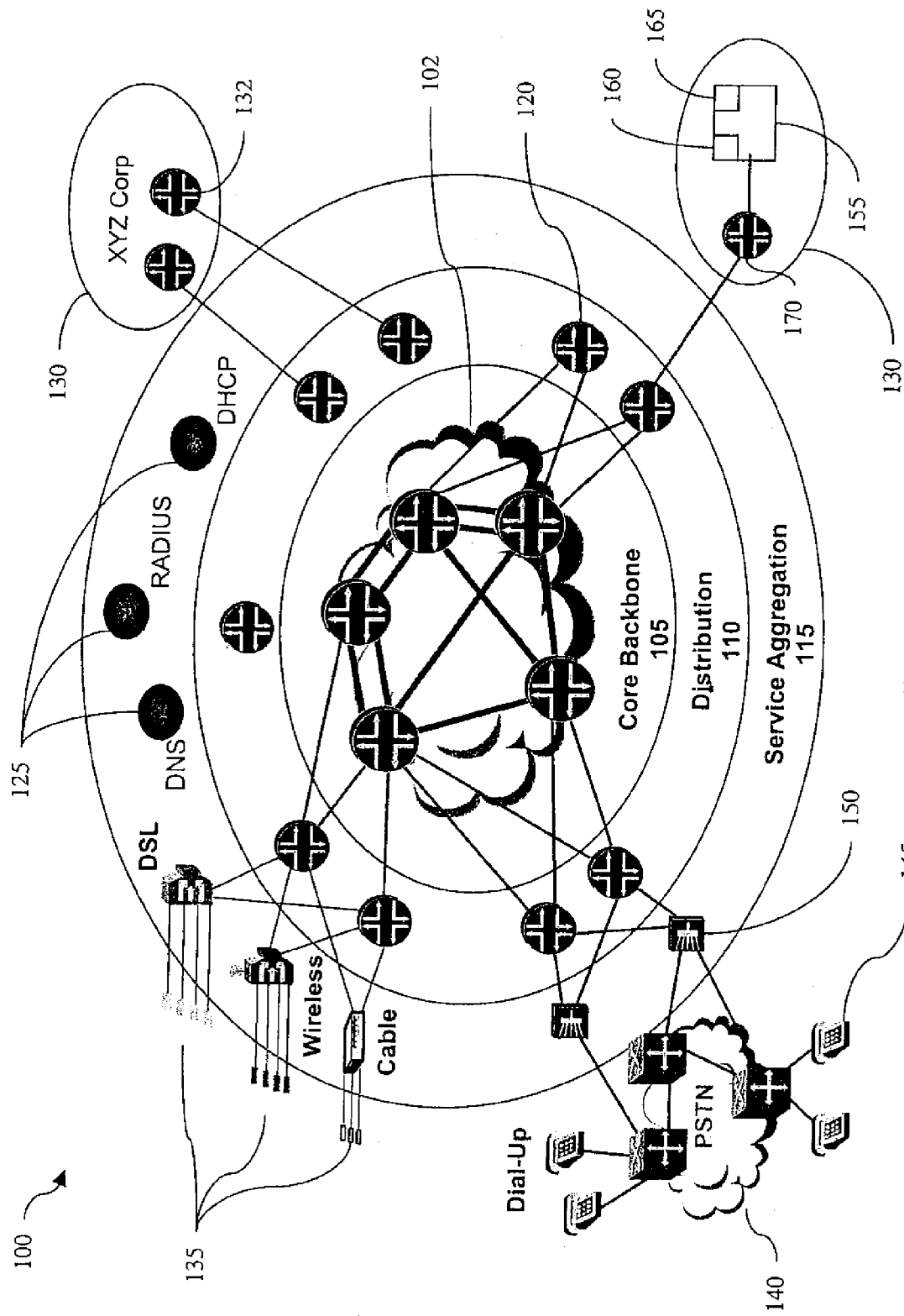
FIG. 1 is a conceptual block diagram of a complex network configured in accordance with the teachings of this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine-readable data structures. Furthermore, it is contemplated that data structures embodying the teachings of the disclosure may be transmitted across computer and machine-readable media, and through communications systems by use of standard protocols such as those used to enable the Internet and other computer networking standards.

This disclosure may relate to machine-readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

FIG. 1 is a functional diagram of a complex network 100 that is desired to be tested in accordance with the teachings of this disclosure.

FIG. 1 depicts an IP cloud 102 within the backbone domain 105 being coupled to various end users through the distribution domain 110 and service aggregation domain 115. The traffic flowing through the IP cloud 102 is transported through the various domains through routers (120) as is known in the art.

Coupled to the service aggregation layer 115 are various users that make up the complex network 100. For example, broadband and wireless service providers 135 may be coupled to the network, providing a wide array of IP-based services to their subscribers.

To provide dial-up service or access to POTS (Plain Old Telephone Service) phones 145, the Public Switched Telephone Network 140 may be coupled to the network through IP-to-voice band conversion equipment 140 such as that typically found in an Internet Service Provider (ISP).

To provide connectivity between users, protocol servers 125 may be provided to serve protocols such as DNS, RADIUS, and DHCP.

Enterprise 130 may be coupled to the network 100 through routers 132 to access services available on the network. For example, enterprise 130 may subscribe to any of the services provided by the service providers 135, such as voice over IP (VoIP), audio or video services, in addition to other standard internet services.

Enterprise 130 may include one or more computers or servers 155 including a processor 160 and associated memory 165 as is known in the art for the storage and execution of embodiments of this disclosure. The computer 155 may be coupled to the network 100 through a router 170. Embodiments may also include a generic network node, including a processor, memory, and a network interface as is known in the art.

Furthermore, the enterprise 130 may provide services over network 100 as part of its business activities. In such as case, the enterprise may desire to determine the availability of its services to customers. As can be seen from the complexity of the system depicted in FIG. 1, many different systems serving many different end users through many different protocols are present, making the singular determination of availability very challenging.

A method and apparatus for determining availability will now be disclosed.

Figure 2:
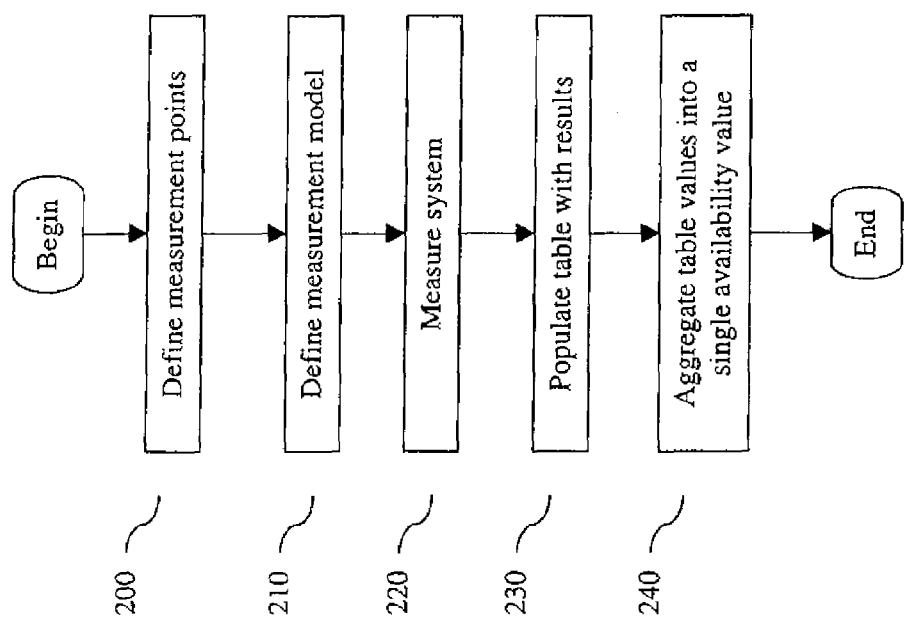
FIG. 2 is a flow diagram of a method for measuring the availability of a complex network configured in accordance with the teachings of this disclosure.

FIG. 2 is a flow diagram of a method for determining the availability state of a complex networked system according to the teachings of this disclosure. The method of FIG. 2 provides a general overview of one aspect of this disclosure, and each act will be further detailed below.

The method begins in act 200, where at least one measurement point in the system is identified. In act 210, one or more measurement models are defined that is preferably configured to return a pass or fail result. In a preferred embodiment, the results correspond to a pre-defined threshold that is sensed at the measurement point.

The process continues at act 220, where the system is measured using the measurement model. Additionally, more than one model may be used, with corresponding measurements being applied. A table may then be populated in act 230 with results returned from the measurement. In a preferred embodiment, the table may include rows corresponding to measurement points and columns corresponding to measurement functions. As a model may include one or more measurement functions, a table with multiple measurement functions may be the result of a single model with multiple measurement functions, or multiple models with fewer functions, including a single function. In further embodiments, the table may be populated with results for multiple measurements.

In act 240, the results in the table are aggregated to formulate a single availability value representing the overall availability of the system. It is contemplated that both row and column values may be aggregated separately or together to determine availability.

Aggregation of rows and columns (independently) will provide different views on the system. For example, aggregation of rows may provide information across multiple functions for a single measurement point in the network. Aggregation of columns would provide information of a single function at multiple measurement points. The aggregation of both rows and columns provides the overall system view of availability.

Each process above will now be disclosed in further detail. Initially, the term availability will be discussed.

As used herein, availability may be expressed as the ratio of the accumulated time during which a system is capable of proper operation to a time period of statistically significant duration called the mission time.

The following equation is the most general form of the availability equation:

$$\text{Availability}(A) = \frac{\text{Accumulated UpTime}}{\text{Mission Time}} = \frac{\text{Accumulated UpTime}}{(\text{Accumulated UpTime} + \text{Accumulated DownTime})}$$

Additionally, as used herein, the concept of availability may be simplified and measured in terms of units of test and polling intervals. In order to simplify the equation, the terminology of the general equation above may be modified using elements related to test and measurement. Essentially, "Accumulated Uptime" is translated into durations (e.g. test intervals). The uptime is then sum of "all tests" times the duration of each test interval minus "failed tests" times the duration of each test interval. In the general case the durations can be different and each can be independently tested. The "Mission Time" is translated into the time over all tests.

$$\text{Availability}(A) = \frac{\sum_{i=1}^{n} \text{Test}_i \times \text{Duration}_i - \sum_{i=1}^{n} \text{FailedTest}_i \times \text{Duration}_i}{\sum_{i=1}^{n} \text{Test}_i \times \text{Duration}_i}$$

In the terms used in this disclosure, availability is described in the terms of tests and polling intervals. From this it can be shown that if a test passes, then 1 unit of uptime has been accumulated. If a test fails, 1 unit of downtime is accumulated. The number of tests conducted will be determined by the polling interval and the monitoring duration. If the polling interval is identical for all tests, the availability calculation simplifies to the following equation:

$$\text{Availability}(A) = \frac{\text{SuccessfulTests}}{\text{TotalTests}} = \frac{\text{SucessfulTests}}{(\text{SuccessfulTests} + \text{FailedTests})}$$

The units for A will be the time duration that was used to conduct the tests. For example, if a system is polled every hour and 24 hours of data is accumulated, one would report the availability per 24 hours or 1 day. For a test every minute and 60 tests are accumulated, then the units of availability would be per hour.

As will be seen later, data may be combined from multiple tests.

The polling interval is a fundamental concept that applies to all availability measurement systems. Simply stated, the polling interval is the frequency that tests are conducted. The selection of the polling interval may be determined by the amount of resources required to collect the data, the amount of resources required to process the data or the desired accuracy of the system.

A basic assumption used herein if a test passes for a polling interval, then the system is considered as "available" for the entire polling interval, and conversely, if a test fails for a polling interval, then the system is considered as "unavailable" for the entire polling interval.

The selection of a polling interval may be chosen according to system demands such as accuracy. For example, consider a system where a single test is conducted every hour for 24 hours. The test itself may only take milliseconds to complete, however, if the test fails one must assume that the system is down for the entire hour. If the test passes, then one can assume the system is up for the entire hour. As the polling interval is decreased, the accuracy of the system increases. A perfect system would have a polling interval of zero and a test that completes instantaneously. Therefore, the selection of a polling interval may be determined by factors that balance system resources against an acceptable level of accuracy.

A further concept associated with a polling interval is that of projections. Projections are calculations of availability using different time intervals than the polling frequency. For example, assume a system has a polling interval of 1 hour. Over the course of 1 day, 24 test results have been collected. Over the course of a year, 8,760 (365×24) test results have been collected. It is possible to calculate projections on the system even before the yearly collection is completed. This facilitates reporting. In many cases availability is reported on a yearly basis.

Regarding measurements, in this disclosure the terms measurements and tests are used interchangeably. The two concepts may be described as Measurement Units—referring to the execution of a single test of any type, and the Measurement Type—referring to the semantics of the test.

In this disclosure, the measurement types can be quite simple or quite complex. For example, a simple test type could check the interface status on a port and report either up or down. On the other hand, a test type may check on a complex protocol exchange between two systems such as a call setup for a voice processing system. For this disclosure, it is desired that each test type must have a binary result of either pass or fail.

This disclosure also uses the concept of aggregation to combine test types and test units. This combination of test units allows for the building of scalable measurement systems, and the combination of test types provides for the building of complex systems to measure various advanced services.

A method for determining the availability of a complex system will now be further disclosed. The selection of measurement points will be discussed first.

One type of measurement suitable for use herein is a passive measurement, where information is collected by network devices from observations made by those devices. The observations are typically concerned with information about the user data traffic that passes the device or on the health of the device itself. The observations can be on user data and/or control data. User data may correspond to the customer payload and control data may be for network control functions such as routing protocols or connection setup delays.

In order to conduct this type of passive measurement, the system only needs to poll a single measurement point. There is no need for test traffic to be inserted into the network (e.g. active measurements are discussed in the next section).

The concept of how many devices should be polled in order to obtain an accurate representation of the network health is a concept called coverage. Information is collected by polling the set of devices. Normally, the administrators will select devices for their critical location in the network topology.

A further type of measurement suitable for use herein is active measurement, involving the injection of test streams into the normal flow of user data traffic. The test streams may carry out any number of different tests.

In order to accomplish this type of testing, there needs to be a source and a destination point. The source normally initiates the tests and the destination will receive test data. In some cases, the destination will loop the incoming packets and return them to the source. In either situation, the result is that information is collected which can provide insight into the behavior of the network between the source and the destination.

Measurement points can be grouped in order to form logical collections of information. The grouping of measurement points for availability measurements is called "availability groups".

The use of availability groups helps facilitate the scalability of the measurement system and also provides bounded areas of the network to clarify the selection of the measurement points.

It is contemplated that availability groups may be administratively defined concepts that group like measurement points. For example, a particular geographic area may make up an availability group. In another example, in a typical three-tiered network structure, the access layer may be considered as one availability group. The core of the network may be considered as another availability group. An availability group may contain both single and/or dual measurement points.

A further concept to consider with availability groups is that of network coverage. Typically, all potential measurement points are not included. The question of "how much" coverage should be provided is a technically complex problem. It is statically difficult to determine what a significant coverage would be for complex networks. In general, network coverage is normally configured around an intuitive approach that intends to provide "adequate" coverage of critical services and or devices based in network topology and business needs.

Figure 3:
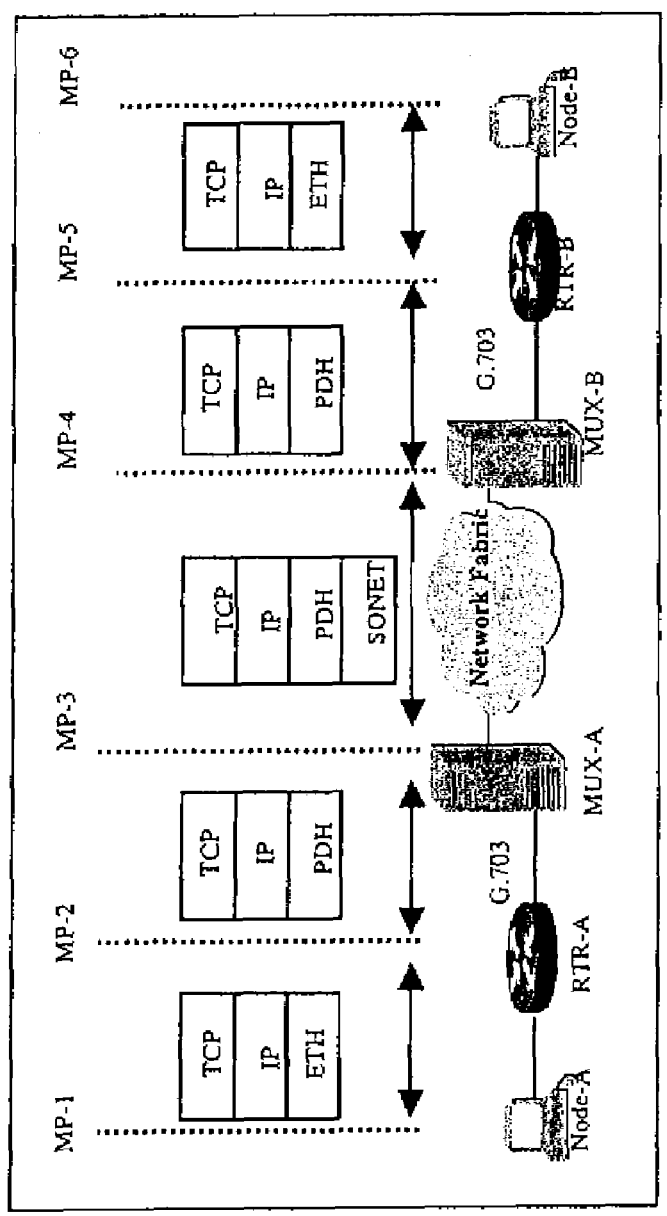
FIGS. 3-7 are conceptual block diagrams showing example measurement points and groups in a complex network configured in accordance with the teachings of this disclosure.

Consider the system shown in the FIG. 3. This system connects two host computers labeled Node-A and Node-B. The host computers are connected by Ethernet to Layer 3 IP devices. The Layer 3 IP routers are labeled RTR-A and RTR-B. The WAN connection is a Layer 2 SONET network. The interface connection between the Layer 3 routers and the SONET MUX is a PDH T1 connection. The T1 connection is multiplex onto the SONET carrier by the mux devices labeled MUX-A and MUX-B.

The boxes between the dashed lines represent the protocol stack at that point in the network. For example consider a TCP connection between HOST-A and HOST-B. Between MP-1 and MP-2, the user data being transferred would be encapsulated by Ethernet, Layer 3 IP and finally, Layer 4 TCP. If the encapsulation between MP-3 and MP-4 is examined, one will see at the lowest level the SONET headers, then the PDH T1 followed by the IP and then the TCP headers.

The possible measurement points are labeled MP-1 through MP-6. Note that at this point, it has not yet decided which MPs will be used, if a single MP will be used or if any will be combined as dual source-destination measurement points.

The selection of measurement points will influence the resulting function of the measurement system. In this example, measurement access is available to the two end mux devices shown in the figure, the routers and the end systems.

Figure 4:
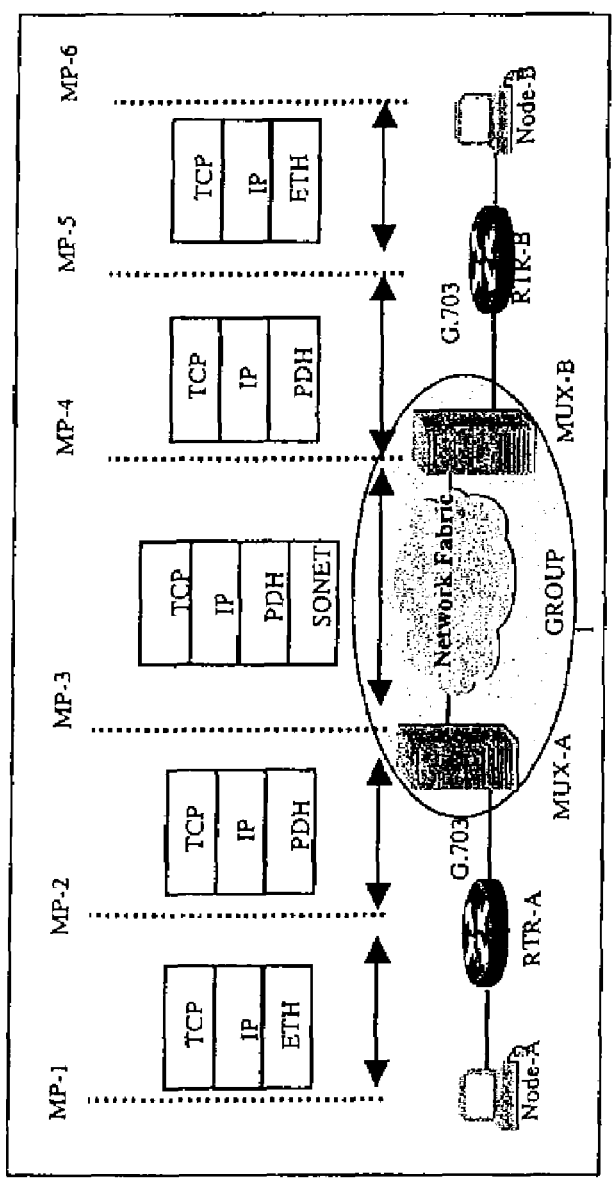

A first group is selected as shown in FIG. 4.

Based on the possibilities for Availability Group 1 (AG1), the following combinations of measurement points are available:

1. MP-3 on MUX-A as a single measurement point.
2. MP-4 on MUX-B as a single measurement point.
3. MP-3 and MP-4 as a dual source-destination measurement point pair.

At this point, one would have to use the definitions of performance and availability for SONET transport to determine what can and should be measured with our combination of measurement points to analyze data from MUX-A and MUX-B collected at the measurement points MP-3 and MP-4.

Figure 5:
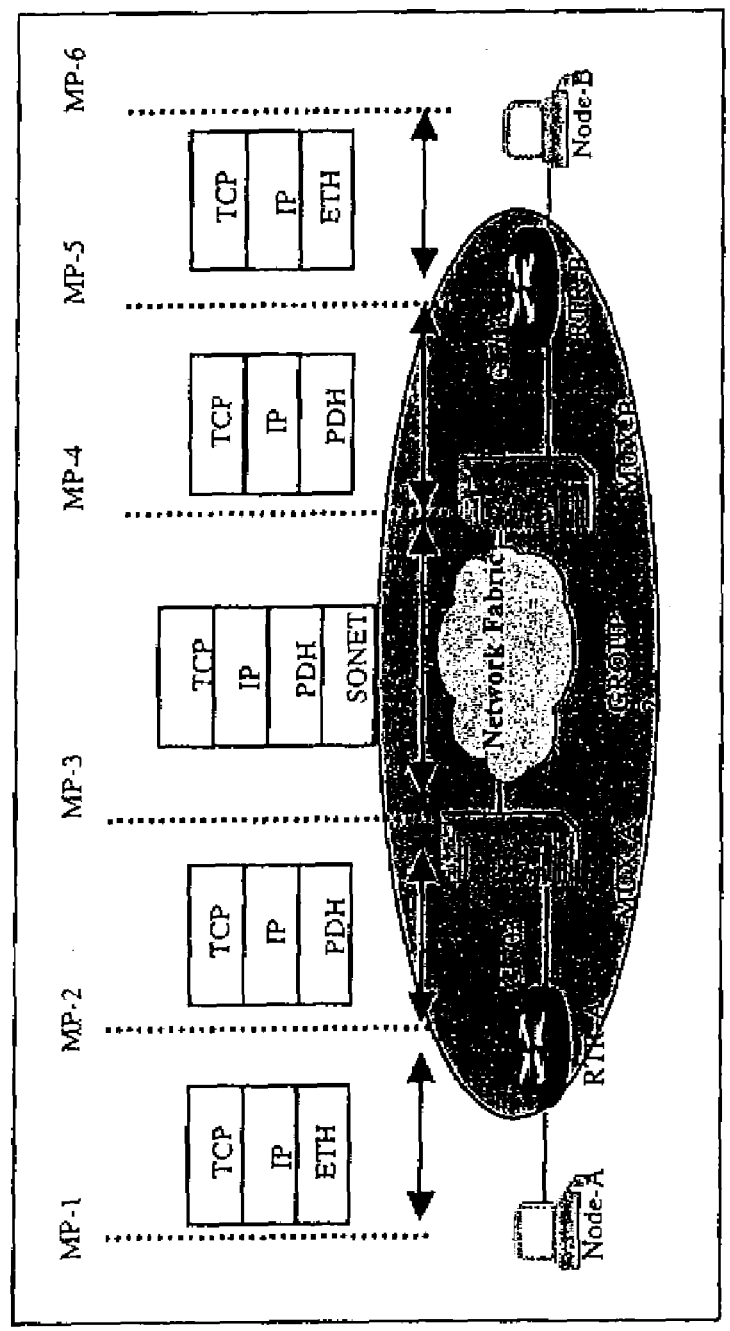

In FIG. 5, an availability group is defined that contains both the SONET transport devices and the Layer 3 routers. The possible measurement points now contain MP-2 through MP-5 in various combinations as seen before.

The possibilities for what can be measured have changed with the introduction of this new availability group. For example, one can now conduct PDH based Active measurements on the T1 circuit between MP-2 and MP-3. One can also conduct Passive Measurements on MP-2, which would provide information on the health of the RTR-A router. The same information that was defined in the previous example from conducting passive and/or active measurements may still be collected between MP-3 and MP-4 as was done earlier.

Figure 6:
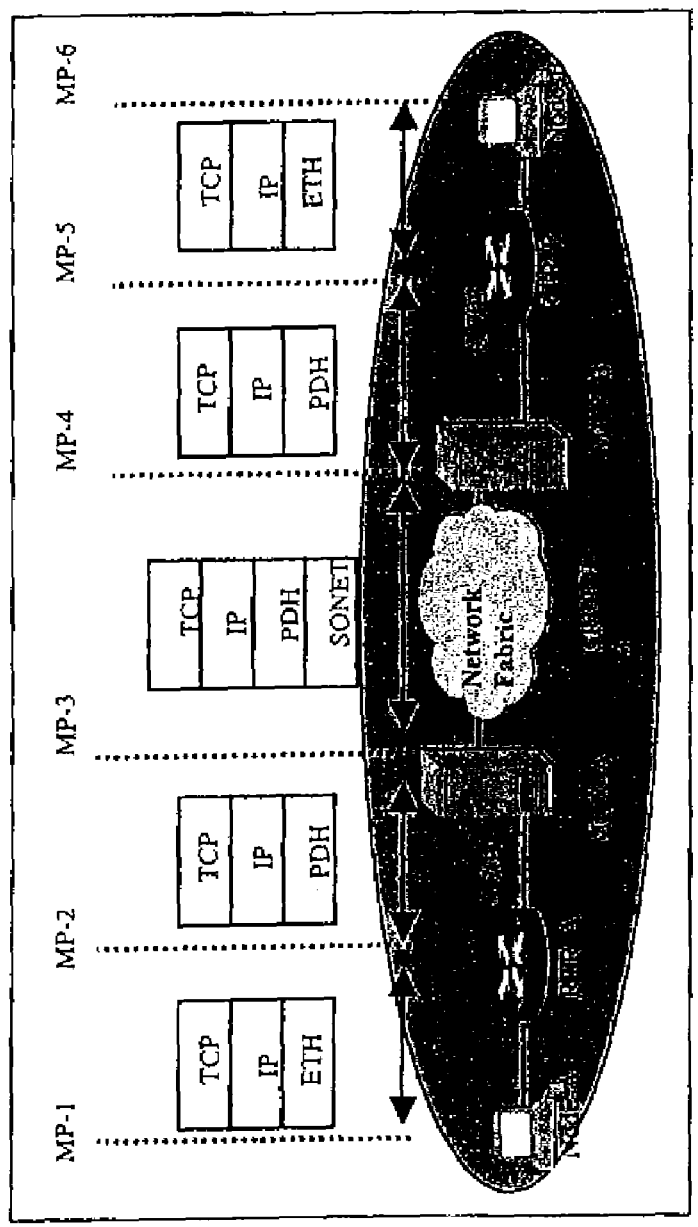

A further availability group is defined in FIG. 6.

All of the elements under administrative control are selected to be a single availability group. One now can measure any combination of single and/or dual source-destination measurement points from the set of MP-1 through MP-6.

Various types of measurements are now available with the following set of measurement points ("MP"):

1. MP-1 as a single MP on Node-A.
2. MP-6 as a single MP on Node-B.
3. MP-1 and MP-6 as a dual source-destination pair between Node-A and Node-B.

For the single MPs, passive measurements may be performed to collect information about the TCP connection status, the IP packet loss, the Ethernet CRC errors and so forth. Between MP-1 and MP-6 active measurements may be performed to determine IP round trip delay, TCP connection establishment times and so forth. Others will be apparent to those of ordinary skill in the art.

Figure 7:
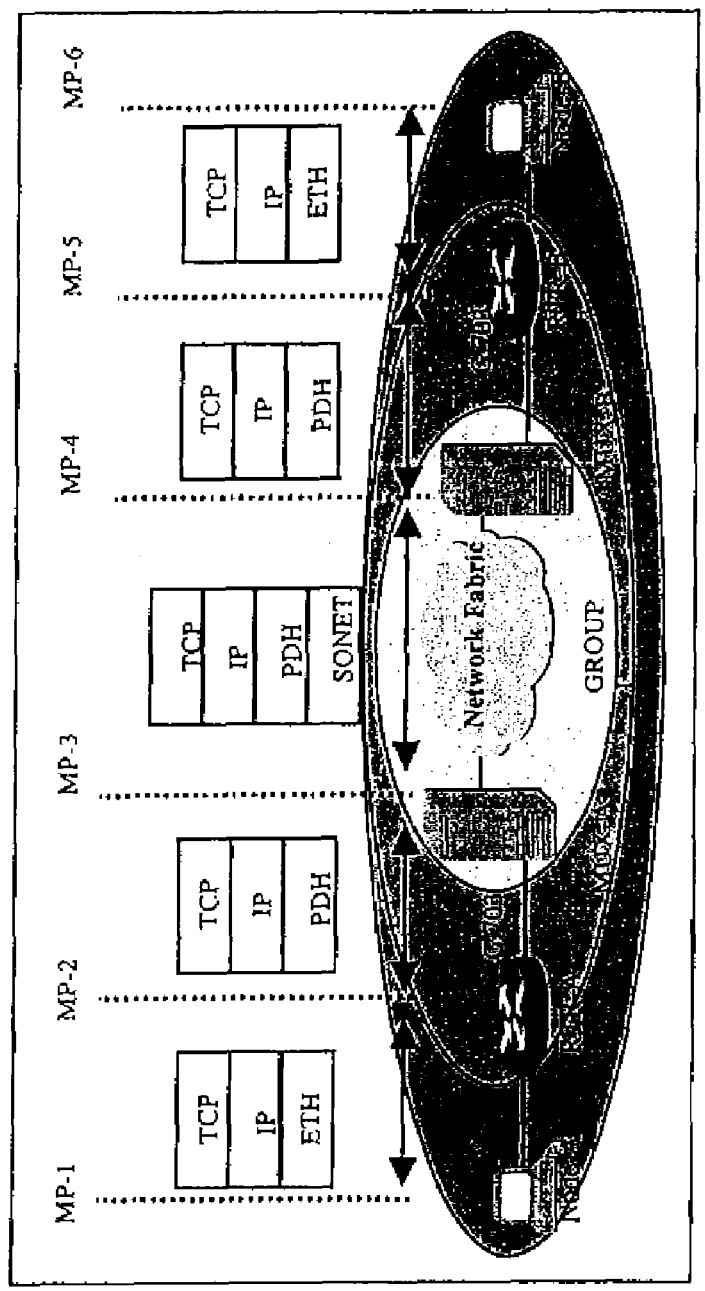

In FIG. 7, all three availability groups are simultaneously defined.

For example, in AG1, SONET metrics may be utilized in order to calculate the health of AG1. This would reduce the representation of AG1 to a single numeric value.

The benefit of this approach is seen regarding AG2. At this point, one does not have to consider the SONET metrics, because they were addressed by the measurements and calculations on AG1. For AG2, one may use PDH and/or device metrics and calculate a single numeric value for AG2.

Finally, for AG3, one can select the appropriate metrics that meet the needs and apply them to the calculation of health for AG3.

By using availability groups, the combination problem may be separated into manageable pieces.

Availability Groups can influence both the selection and function of measurement points, and can help reduce the complexity regarding combination and aggregation for reporting purposes.

The defining of a measurement model will now be discussed.

As will be appreciated by those of ordinary skill in the art, a system depends on a hierarchy of sub-components. When developing a model, one must select one of the sub-components for analysis, and examine the ways in which that component may fail.

Standard models may provide guidance, such the OSI stack layer. For example, if at the lowest OSI layer the focus is on a hardware device, then a failure mode may be memory exhaustion. If the focus is on higher layers in the dependency stack, one may select various protocol states or timers.

If models are being developed for hardware components or lower level physical components, then what could be measured would be limited by the characteristics of that component. However, if protocols are being analyzed, then a useful tool for protocol analysis has been developed by the ITU-T and is known as the three-by-three matrix.

An example 3×3 matrix is shown here:

| Criterion/Function | Speed | Accuracy | Dependability |
|---|---|---|---|
| Connection set-up (access) | Service specific definitions | Service specific definitions | Service specific definitions |
| User information transfer | Service specific definitions | Service specific definitions | Service specific definitions |
| Connection disengagement (release) | Service specific definitions | Service specific definitions | Service specific definitions |

Such a 3×3 matrix can be used as a guide when developing models that are intended to represent the availability state of protocols. Normally for most protocols an IETF based SNMP or an OSI based CMIP MIB will exist. Using the 3×3 matrix as a guide, one can select one or more parameters that represent a failure mode that is of interest.

Measurement models preferably include an evaluation function that results in a binary value (either Pass or Fail). In a further preferred embodiment, threshold crossings are used to determine and define pass or fail conditions.

Thus, the system will be examined to determine if there exists for any set of parameters a function that will result in a numeric value or state. When such a function is found, a threshold may then be defined that, when compared to the result of the function, will yield either a Pass or Fail binary condition. This is shown graphically in FIG. 7.

Figure 8:
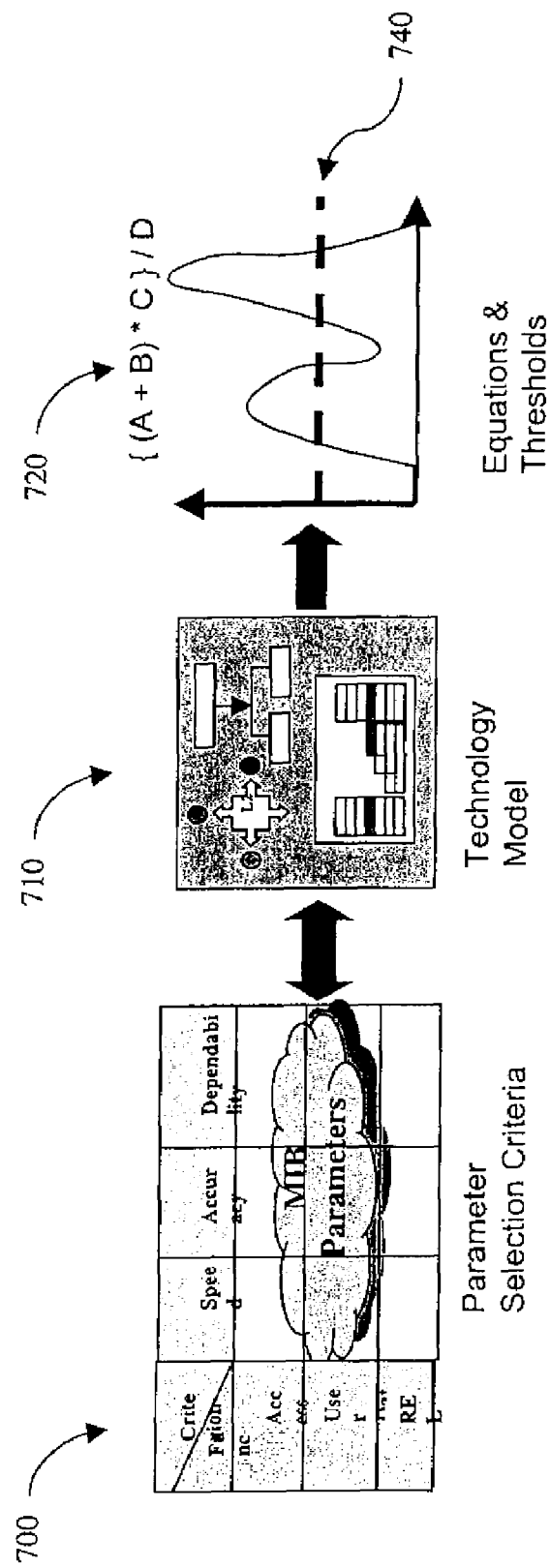
FIG. 8 is a conceptual block diagram of determining measurement thresholds in a complex network configured in accordance with the teachings of this disclosure.

FIG. 8 illustrates that a matrix 700 may be used to determine measurement selection criteria. A technology model 710 corresponding to particular technology may then be examined to define a measurement function 730. The function 730 may then be examined to define a particular threshold 740 that may be used to define a pass/fail threshold.

After the desired measurements are taken, a table may then be populated with the returned results, and the table aggregated to return the availability value.

For complex systems using several different technology models, aggregation may be used to combine the information from several models into an overall system view.

In a preferred embodiment, the availability formula is determined assuming that all tests used identical polling intervals, and that the collection and consolidation function maintain a strict sense of polling interval.

Aggregation can be considered at two levels. At a basic level, aggregation can be used to combine the results for a group of measurement points for a single polling interval, as in a single column in a spreadsheet. At a different level, consolidation can be used to combine multiple results for a group of devices for a single polling interval, as in multiple columns of a spreadsheet.

In this disclosure, these two concepts of consolidation are referred to 1) vertical consolidation—multiple measurement points, single function, single polling interval; and 2) horizontal consolidation—single measurement point, multiple function single polling interval.

Note the common factor between vertical and horizontal consolidation is the key concept of a single polling interval. A key point is that consolidation should be considered with a strict sense of a polling interval.

A useful tool in consolidating information is a tabular spreadsheet. At the most basic level the spreadsheet contains one row for each measurement point as discussed earlier and one column for each function.

From this point on the functions will be referred to as AvFs (availability functions).

Note that multiple AvFs may be applied to each measurement point.

Figure 9:
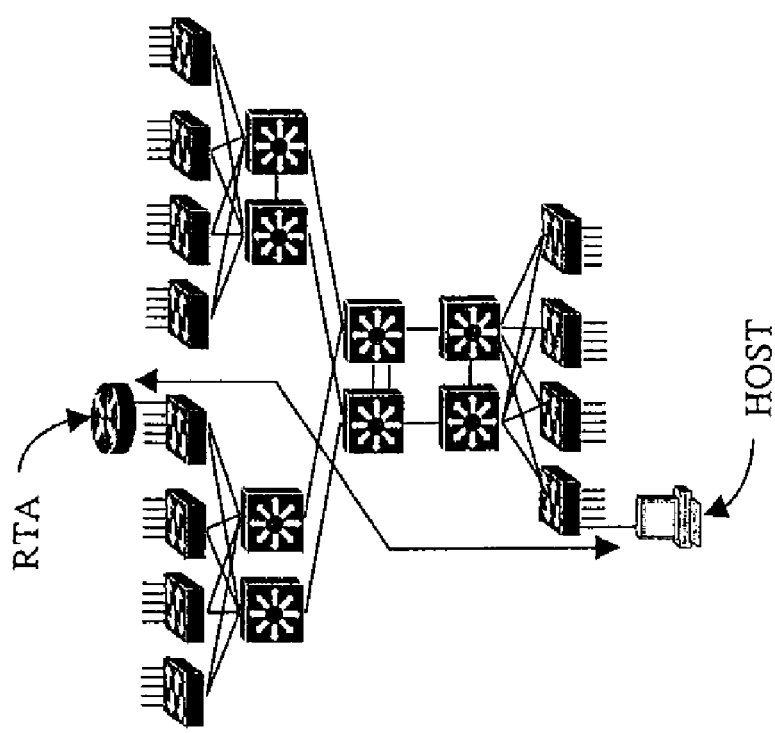
FIG. 9 is a conceptual block diagram of an example complex network configured in accordance with the teachings of this disclosure.

Consider the example system shown in FIG. 9. Assume, that it is desired to monitor two elements, the router RTA and the host node HOST. The Measurement points (RTA and HOST) will comprise the rows in the spreadsheet.

Now assume that models have been selected, MIB parameters have been identified, and availability functions defined with thresholds for three sets of tests. One test is applied to both RTA and HOST. Note that if the test was between RTA and HOST then the measurement point (e.g. row) in the table may be labeled RTA-HOST to indicate a active test between RTA and HOST (e.g. source/destination type test).

*AvF #1 applies to both RTA and HOST
*AvF #2 applies only to RTA
*AvF #3 applies only to HOST In this case, the spreadsheet would have two rows (one for each measurement point) and three columns (one for each AvF) as shown in the table below:

| Measurement Points | AvF #1 | AvF #2 | AvF #3 |
|---|---|---|---|
| RTA | <value> | <value> | NA |
| HOST | <value> | NA | <value> |

Data may be consolidated in both vertical and horizontal manners. Vertical consolidation will be discussed first.

Recall that consolidation is considered on a polling interval basis. In the simplest case (say for one MP and one AvF, which would result in a spreadsheet with one cell), then no consolidation would be required. This is because each polling interval would result in one value. A series of polling intervals would result in a series of numbers representing the state of the measurement point at each polling interval.

Each number in the series represents a measurement taken at a predefined interval (the polling interval).
Single Series
MP1—3,4,5,6,7,8,3,2,4,5,6,7

In a slightly more complex case, MP and one AvF may be present. In this case, two series of numbers are present:
MP1-3,4,5,6,7,8,3,2,4,5,6,7
MP2-6,7,4,3,2,3,5,6,7,8,9,3

In this case, one can combine the results for each measurement point for a single polling interval, resulting in vertical consolidation.

Thus, the consolidated value will contain information about both measurement points and therefore represents the vertically consolidated information for the single AvF on two measurement points.

Example vertical consolidation will now be disclosed.

Maximum Value Consolidation—One method of combining the information contained in the series for an AvF is by selection of the maximum value.

In the case of threshold crossings, this is a preferred method. It is based on the concept that the if any data in the set crosses a threshold, then the entire set will be considered to have crossed the threshold.

Average Value Consolidation—Another preferred consolidation function would be to calculate the average (or mean) over the set of data. The consolidated value would then represent the average value over all of the measurement points for the single interval.

Binary Value Consolidation—Perhaps the most flexible form of consolidation is the binary value consolidation method. In this method a unique threshold value can be set for any cell in the spreadsheet. For example, consider the following example. If a spreadsheet has multiple MP (e.g. rows) and multiple AvF (e.g. columns), then a unique threshold can be set for a single MP on a single AvF. For the same MP, a different threshold can be set for a second AvF. In the binary value consolidation method, if the AvF results for the cell exceed a threshold, then the value for that cell will be set to FALSE (e.g. test failed).

Similarly, for a single AvF (e.g. column), different threshold values can be set for each MP (e.g. row) that supports the AvF. The same logic would be applied to each cell in the column. That is, if the AvF returns a value that is over the threshold, then the cell will be marked as FALSE.

Combining the cells (either vertically or horizontally) can also provide flexibility. In the simplest case, a logical AND function can be applied. For example, if any cell in the row or column is FALSE, then the combined result will be FALSE. On the other hand a percentage value may be used. For example, if 3 out of 5 are FALSE, then the combined value will be FALSE.

In the simplest and most practical case, the logical AND function can be applied both vertically and horizontally. In this case, any cell in the spreadsheet that results in FALSE, will result in the total combined result for all the rows and columns being recorded as FALSE.

Finally, horizontal aggregation will be discussed using an example having two measurement points, and two availability functions:

| Measurement Point | AvF1 | | | AvF2 | | | HORIZONTAL | |
|---|---|---|---|---|---|---|---|---|
| | Int 1 | Int 2 | Int 3 | Int 1 | Int 2 | Int 3 | Int 1 | Int 2 |
| MP-1 | A1 | A2 | A3 | C1 | C2 | C3 | F"(A1,C1) | F"(A2,C2) |
| MP-2 | B1 | B2 | B3 | D1 | D2 | D3 | F"(B1,D1) | F"(B2,D2) |
| VERTICAL | F(A1,B1) | F(A2,B2) | F(A3,B3) | F'(C1,D1) | F'(C2,D) | F'(C3,D) | | |

The bottom row in the table is the vertical consolidation as discussed previously, with multiple AvFs. Note that for each AvF, there may be different consolidation functions. However, in order to keep consolidation simple, it is preferred that the vertical consolidation functions be the same for each AvF (e.g. either maximum, average or binary value as discussed above).

The vertical consolidation function allows for the combination of AvF results in a column (e.g. for multiple measurement points). Each AvF (column) is shown in the table for multiple polling intervals.

The horizontal consolidation function is shown in the last two (2) columns. Note that horizontal consolidation is shown only for two polling intervals due to space. More polling intervals may be provided.

Recall that the primary aspect of both availability and performance is that of a threshold crossing. The horizontal consolidation functions may also comprise the maximum, average, or binary value based consolidations discussed above.

To tie together the concepts disclosed herein, consider the following example:

| MP | ICMP Int #n | | TCP Int #n | | HTTP Int #n | | Horizontal Consolidation |
|---|---|---|---|---|---|---|---|
| Path-1 | 32 | Fail | 10 | Pass | 42 | Pass | Row Fail |
| Path-2 | 24 | Fail | 24 | Fail | 58 | Pass | Row Fail |
| Path-3 | 16 | Pass | 18 | Pass | 37 | Pass | Row Pass |
| Vertical Consolidation | 32 | 66% | 24 | 33% | 58 | 0% | |

1 of 3 = 33%

Consider the example data in the table above. For ICMP, assume the threshold is 20 ms. For TCP, assume the threshold is 23 ms. For http, assume the threshold is 60 ms.

In the ICMP AvF column, it can be seen that two measurement points (e.g. paths or rows) failed the test. The path-1 and path-2 rows are over threshold. The vertical consolidation function shows the maximum value (32 ms) and the percentage of rows that failed (in this case 2 out of 3=66%).

For the TCP AvF column, only path-2 failed the test. The vertical consolidation function shows the maximum value and the fact that 1 of 3 measurement points failed, giving a 33% failure rate.

For the HTTP AvF column, all measurement points passed. The vertical consolidation function shows the maximum value (58 ms) and the fact that 0 of 3 failed or 0%.

The horizontal consolidation function would show that if any AvF failed, then the row would be considered as failed. In the example above, one can see that Path-1 and Path-2 had AvF failures while Path-3 passed all AvFs. This results in 2 measurement points out of three as failing. Or alternatively in terms of availability, 1 out of three were "up" resulting in 33% availability. Note that this calculation would be repeated for every polling interval resulting in a series of availability numbers over time.

Thus, as will be appreciated by those skilled in the art, a single availability value (33% in the above example) has been calculated for a complex system.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method for performing an availability measurement on a networked system comprising:
   identifying at least one measurement point in the system;
   defining a measurement model configured to return a pass or fail result corresponding to a threshold sensed at said at least one measurement point and to a measurement function;
   measuring said system using said measurement model, wherein said measuring said system comprises a plurality of measurements;
   collecting a plurality of pass or fail results from said plurality of measurements, wherein each one of said plurality of pass or fail results corresponds to a measurement point and to a measurement function of one or more measurements; and
   aggregating said plurality of pass or fail results to formulate a single availability value representing the availability of said system.

2. The method of claim 1, wherein said at least one measurement point includes a group of measurement points defined by bounded areas of said system.

3. The method of claim 2, wherein each of said at least one measurement point has a corresponding mathematical availability function configured to return said pass or fail result.

4. The method of claim 3, wherein said act of measuring said system occurs at a fixed polling interval.

5. An apparatus for performing an availability measurement on a networked system comprising:
   a computer coupled to the networked system and comprising a network interface and one or more processors that are configured to:
   measure said system using a measurement model, said measurement model configured to return a pass or fail result corresponding to a threshold sensed at a measurement point and to a measurement function, wherein said measure of said system comprises a plurality of measurements;
   collect a plurality of pass or fail results from said plurality of measurements, wherein each one of said plurality of pass or fail results corresponds to a measurement point and to a measurement function of one or more measurements; and
   aggregate said plurality of pass or fail results to formulate a single availability value representing the availability of said system.

6. The apparatus of claim 5, wherein said measurement point includes a group of measurement points defined by bounded areas of said system.

7. The apparatus of claim 6, wherein each of said measurement points has a corresponding mathematical availability function configured to return said pass or fail result.

8. The apparatus of claim 7, wherein said measuring said system occurs at a fixed polling interval.

9. An apparatus for performing an availability measurement on a networked system comprising:
   means for measuring said system using a measurement model, said measurement model including means for returning a pass or fail result corresponding to a threshold sensed at a measurement point and to a measurement function, wherein measuring said system comprises a plurality of measurements;
   means for collecting a plurality of pass or fail results from said plurality of measurements, wherein each one of said plurality of pass or fail results corresponds to a measurement point and to a measurement function of one or more measurements; and
   means for aggregating said plurality of pass or fail results to formulate a single availability value representing the availability of said system.

10. The apparatus of claim 9, wherein said measurement point includes a group of measurement points defined by bounded areas of said system.

11. The apparatus of claim 10, wherein each of said measurement points has a corresponding mathematical availability function means for returning said pass or fail result.

12. The apparatus of claim 11, wherein said measuring means include means for measuring said system at fixed polling interval.

13. A program storage device readable by a machine, tangibly embodying a program of instructions executable by the machine to perform a method for performing an availability measurement on a networked system, the method comprising:

identifying at least one measurement point in the system;

defining a measurement model configured to return a pass or fail result corresponding to a threshold sensed at said at least one measurement point and to a measurement function;

measuring said system using said measurement model, wherein said measuring said system comprises a plurality of measurements;

collecting a plurality of pass or fail results from said plurality of measurements, wherein each one of said plurality of pass or fail results corresponds to a measurement point and to a measurement function of one or more measurements; and aggregating said plurality of pass or fail results to formulate a single availability value representing the availability of said system.

14. The device of claim 13, wherein said at least one measurement point includes a group of measurement points defined by bounded areas of said system.

15. The device of claim 14, wherein each of said at least one measurement point has a corresponding mathematical availability function configured to return said pass or fail result.

16. The device of claim 15, wherein said act of measuring said system occurs at a fixed polling interval.

* * * * *